United States Patent
Shaw et al.

[19]

[11] Patent Number: 5,845,800
[45] Date of Patent: Dec. 8, 1998

[54] FILLER CAP ASSEMBLY

[75] Inventors: James Shaw; Thomas George Morgan; Charles Gordon Grandy, all of Naples, Fla.

[73] Assignee: Shaw Aero Development, Inc., Naples, Fla.

[21] Appl. No.: 800,414

[22] Filed: Feb. 14, 1997

Related U.S. Application Data

[60] Provisional application No. 60/029,970 Mar. 4, 1996.

[51] Int. Cl.$^6$ .......................... B65D 45/28; B65D 45/24
[52] U.S. Cl. ........................ 220/210; 220/201; 220/238; 220/246; 220/86.2; 220/DIG. 33
[58] Field of Search ..................... 220/201, 210, 220/DIG. 33, DIG. 32, DIG. 20, 86.1, 86.2, 86.3, 315, 246, 251, 233, 234, 238; 215/204, 359, 358, 361, 294

[56] References Cited

U.S. PATENT DOCUMENTS

| | | | |
|---|---|---|---|
| 634,240 | 10/1899 | Hoyt | 215/359 |
| 2,306,699 | 12/1942 | Johnson | 220/246 |
| 2,604,225 | 7/1952 | Armstrong . | |
| 2,756,897 | 7/1956 | Houghton | 220/238 |
| 2,967,637 | 1/1961 | De Pew | 220/238 |
| 3,086,675 | 4/1963 | Clark, Jr. | 220/238 |
| 3,087,641 | 4/1963 | Millard . | |
| 3,091,358 | 5/1963 | Simpkins . | |
| 3,093,220 | 6/1963 | Modrey . | |
| 3,289,442 | 12/1966 | Berger et al. | 220/210 X |
| 3,295,712 | 1/1967 | Peterson . | |
| 3,337,097 | 8/1967 | Day . | |
| 3,771,177 | 11/1973 | Rogers et al. . | |
| 3,901,407 | 8/1975 | Mitchell et al. . | |
| 4,083,468 | 4/1978 | Batchelor . | |
| 4,189,059 | 2/1980 | Shaw | 220/251 X |
| 4,294,376 | 10/1981 | Keller | 220/323 X |
| 4,420,844 | 12/1983 | Puckett et al. . | |
| 4,458,711 | 7/1984 | Flider | 220/201 X |
| 4,467,937 | 8/1984 | Shaw . | |
| 4,508,356 | 4/1985 | Janian . | |
| 4,567,994 | 2/1986 | Hofmann . | |
| 4,579,244 | 4/1986 | Fukuta | 220/210 X |
| 4,872,584 | 10/1989 | Sakai | 220/201 |
| 4,892,216 | 1/1990 | Scott . | |
| 4,921,123 | 5/1990 | Mizioch . | |
| 4,930,657 | 6/1990 | Walker . | |
| 4,993,246 | 2/1991 | Kopper . | |
| 5,042,677 | 8/1991 | Chen et al. | 220/201 |
| 5,129,419 | 7/1992 | Stapleton . | |
| 5,197,515 | 3/1993 | Saville et al. . | |
| 5,385,256 | 1/1995 | Brown | 220/DIG. 33 |

FOREIGN PATENT DOCUMENTS

415890  3/1991  European Pat. Off. ........ 220/DIG. 33

*Primary Examiner*—Stephen Cronin
*Assistant Examiner*—Nathan Newhouse
*Attorney, Agent, or Firm*—Pennie & Edmonds LLP

[57] ABSTRACT

A filler cap assembly includes a sleeve welded to a tank wall, and a non-indexing filler cap. The cap is formed with top and bottom members, each member having an outwardly bevelled surface opposing a corresponding surface on the other member. An elastic O-ring is positioned between the two surfaces. The top member and base member are held together by an axially extending shaft, with a spring biasing apart the two members. The shaft is connected in a hinged manner to a cam lever. Activation of the cam lever brings the two opposing surfaces together, forcing the O-ring outward to form a seal with the sleeve. The filler cap and the sleeve's inner wall are provided with additional features which maintain the filler cap in the sleeve.

27 Claims, 5 Drawing Sheets

FILLER CAP ASSEMBLY

This application claims the benefit under 35 U.S.C. § 119(e) of Provisional Application No. 60/029,970, filed Nov. 4, 1996.

BACKGROUND

The present invention relates to a filler cap assembly for fuel tanks and other fluid-holding containers. More particularly, it concerns a non-indexing filler cap which uses an expandable O-ring to seal the space between the cap and a sleeve into which the cap is inserted.

Closure assemblies with outwardly expandable sealing members are well known in the prior art. Prior art sealing members in the form of solid cylindrical elements (U.S. Pat. No. 3,093,220), tubular cylindrical shells (U.S. Pat. No. 3,087,641), and ring-shaped elements (U.S. Pat. No. 4,567,994) have all been used. Most often, cylindrical sealing members are compressed in the axial direction, creating a bulge along their length. This bulge causes the member to abut the side walls of a sleeve or other adapter into which they are inserted. The sealing member in these assemblies serves two purposes. First, it helps prevent the unintentional removal of the closure itself by applying outward pressure against the walls of a sleeve or other adapter fixed to the object being sealed. Second, the sealing member prevents the passage of liquids and vapors. Thus, such assemblies have been adapted to serve as fuel tank caps, bottle caps, drain plugs and also in other applications requiring a removable cover.

Most often, the sealing member is moved between a sealed position and an unsealed position by a manually operated handle or other actuating member. The prior art includes a variety of sealing member designs with corresponding actuating means. U.S. Pat. No. 3,093,220, for instance, discloses a smooth resilient cylinder which is compressed between a top plate and a bottom plate, causing the cylinder to bulge outwardly near its middle. In U.S. Pat. No. 4,567,994, an annular ring is pushed outward in a radial direction by fingers pivotally attached to a sleeve which moves in an axial direction in response to the operation of the handle.

Cap assemblies for fuel tanks and similar containers are well known. Typically, an opening is made in a side of the tank, a substantially cylindrical sleeve is inserted into the opening and the sleeve is then permanently attached to the tank. The sleeve may be threaded, in which case the tank is sealed with a filler cap which is screwed on. Alternatively, the sleeve may have a non-threaded, radially symmetric inner surface. In this latter case, the filler cap is non-indexed, i.e., it may be inserted into the sleeve in a rotationally invariant manner. A lever or other handle may then be used to cause a member to exert outward force against the inner walls of the sleeve to effect a seal. Such assemblies, however, are rather complex, adversely impacting their reliability, integrity and cost.

SUMMARY OF THE INVENTION

The present invention is directed to a cap and sleeve assembly for sealing a container. The cap comprises opposing upper and lower members movable in an axial direction relative to one another. A lever, operatively coupled to the lower member, moves the members between a first, unsealed, position and a second, sealed, position. An elastic O-ring is stretched around the cap, between corresponding upper and lower surfaces. With the cap in the unsealed position, the O-ring rests in a region between the two surfaces, and has a first outer diameter. As the cap is moved to the sealed position, the members, and thus the surfaces, approach one another. This forces the O-ring radially outward, causing it assume a second outer diameter and form a seal against a sleeve into which the cap has been inserted.

In one embodiment, the sleeve is provided with a circumferential channel into which the O-ring is forced, to prevent accidental removal of the filler cap from the sleeve.

In another embodiment, the filler cap is provided with a bottom plate fixed to an axial shaft and positioned beneath the base member. A locking spring is placed between the bottom plate and the base member. When the assembly is moved into a sealed position, the locking spring pushes the base member upward for a predetermined distance and then locks into place, a leg of the locking spring becoming wedged in a channel formed in an inner surface of the sleeve.

In yet another embodiment, the inner wall of the sleeve has two sections, the first having a smaller inner diameter than the second. A wall of one of the top and base members is provided with at least one movable locking element, and a third surface is formed on the other of the top and base members. When the assembly is moved into a sealed position, the third surface forces the locking member radially outward, causing its radially outermost portion to project beyond the smaller inner diameter of the first section, proximate to a region of merger of the two sections. This prevents the cap from being removed.

An additional feature is that the cap is provided with protrusions which protect the lever and prevent the seal from rupturing in the event that the cap suffers an impact during a collision or other accident.

Another additional feature is that the cap is provided with a lock which prevents unauthorized removal of the former.

DETAILED DESCRIPTION OF THE INVENTION

Figure 1:
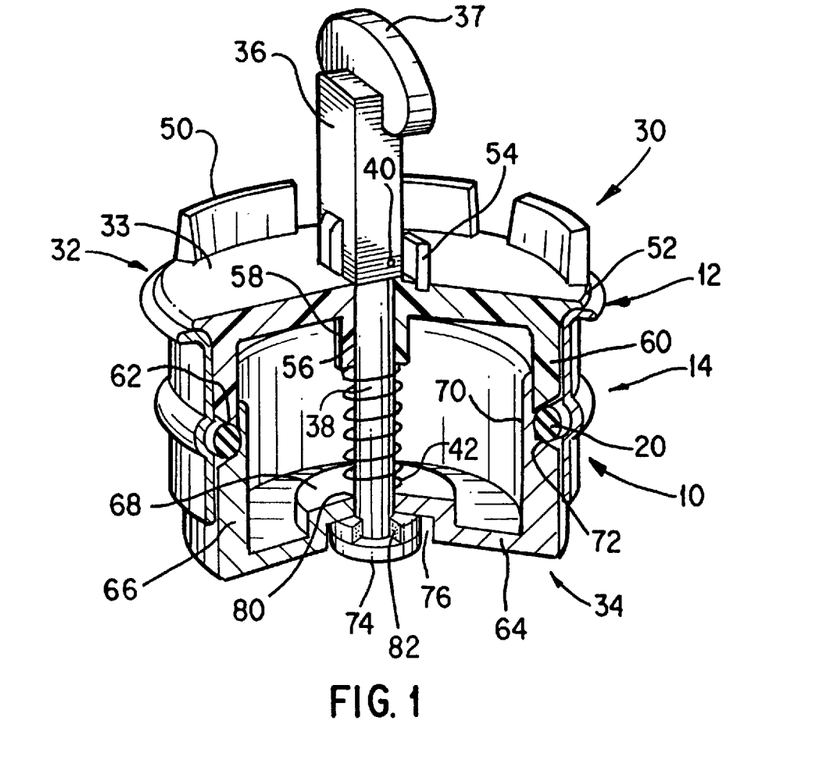
FIG. 1 is a partially cut-away side view of a first embodiment of a filler cap assembly in accordance with the invention, shown in the unsealed position.

Referring to FIG. 1, a filler cap assembly in accordance with the present invention comprises a substantially annular sleeve 10 into which a filler cap 30 is fitted. Preferably, the filler cap is made from corrosion-resistant materials, either thermoplastic or metallic. This enables it to withstand abuse from daily service and weather elements. The sleeve 10 is preferably formed from the same material as the tank, although other materials may be used.

Figure 3:
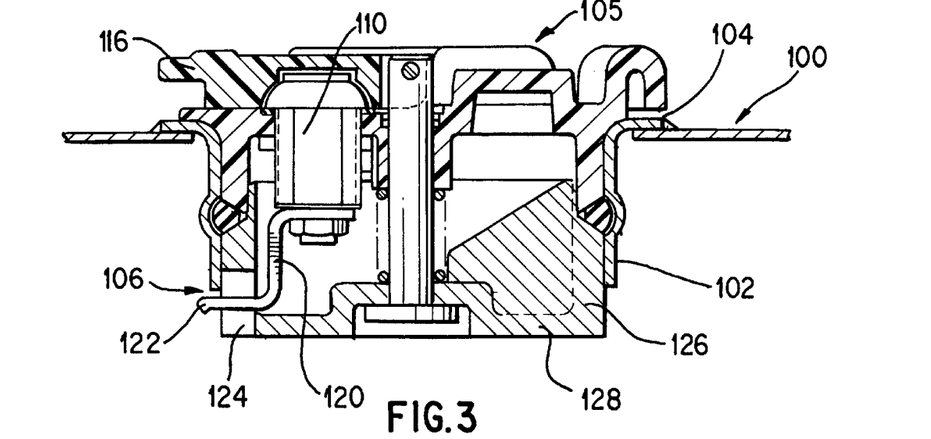
FIG. 3 is a cut-away side view of an assembly showing a lockable filler cap in accordance with the present invention.

The sleeve 10 is formed with a sleeve lip 12 and circumferential channel 14 adapted to accommodate an O-ring seal 20 in a sealing manner. When placed over the opening of a tank, the sleeve lip 12 abuts the outer wall 100 of a tank, as shown in FIG. 3. Sleeve lip 12 is welded to the tank wall 100, although other fastening means including adhesives and rivets may be used, depending on the material used for both the tank and the sleeve 10.

Figure 8:
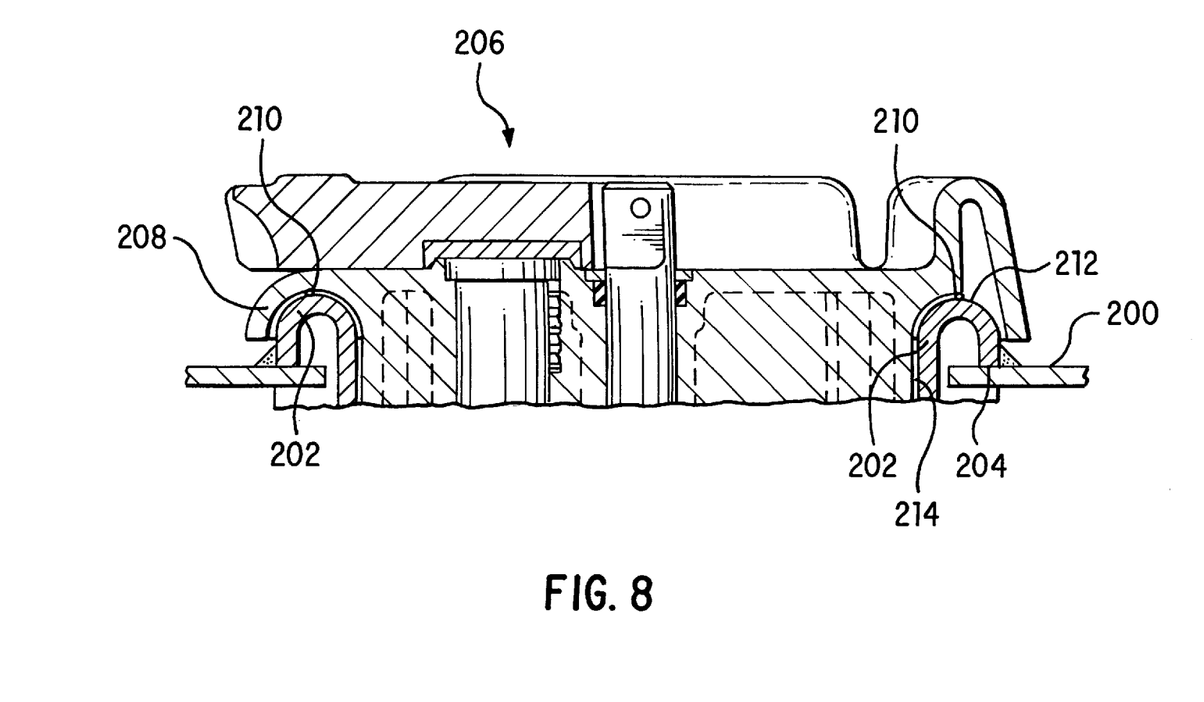
FIG. 8. shows an alternate arrangement for sealing the top to the sleeve.

Alternatively, as shown in FIG. 8, the top end of the sleeve can be provided with a sleeve lip 202 which extends above the outer wall 200 of the tank and then arc downwards so that its edge 204 abuts the outer wall. The edge 204 can then be welded to the outer wall 100 to secure the sleeve to the tank. When the sleeve lip 202 is arced in this manner, the underside of the filler cap 206 is provided with a complementary lip 208. The complementary lip 208 follows the contours of the sleeve lip 202 for at least a portion of the circumference of the sleeve lip so that the underside fits onto the sleeve lip 202. This arrangement provides added protection against the penetration of water and foreign debris into the annular area 214 above the seal between the cap 206 and the sleeve 202. The underside of the filler cap is also provided with a bead member 210 that contacts the sleeve radius at the top radius 212 of the j-shaped sleeve lip 202.

Figure 2:
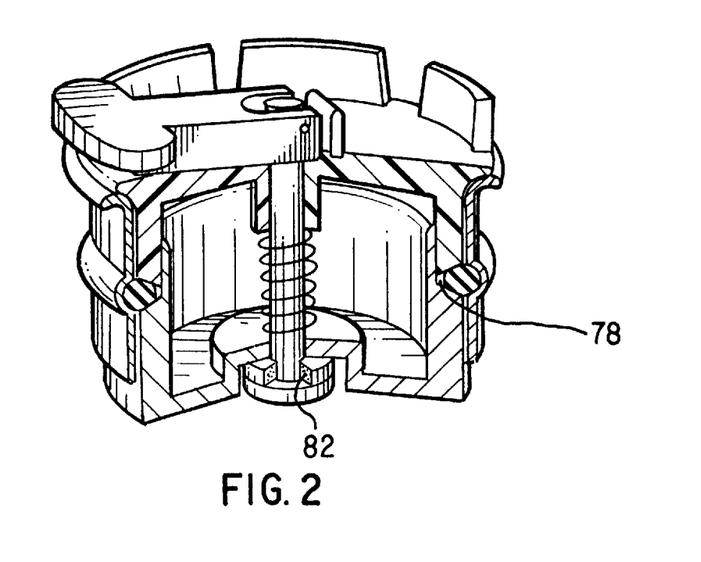
FIG. 2 is a view of the assembly of FIG. 1 in the sealed position.

It should be evident to one skilled in the art that the arrangement of the arced sleeve lip 202 and complementary lip 208 of FIG. 8 can be provided for the embodiment shown in FIGS. 1 & 2, and also the embodiment of FIG. 3.

As shown in FIG. 1, the filler cap 30 in accordance with the present invention includes a top member 32, a base member 34, a cam lever 36 terminating in a handle 37, a shaft 38, a pin 40 connecting the lever and the shaft 38, and a spring 42 axially mounted along the shaft, biasing apart the top 32 and the base 34 members.

The shaft 38 is indexed in the base 34 at the base opening 80. The top 32 and base 34 are indexed internally with a guide pin. This indexing provides alignment of the components and prevents free rotation which could mis-align the handle in the down position.

Figures 4, 5:
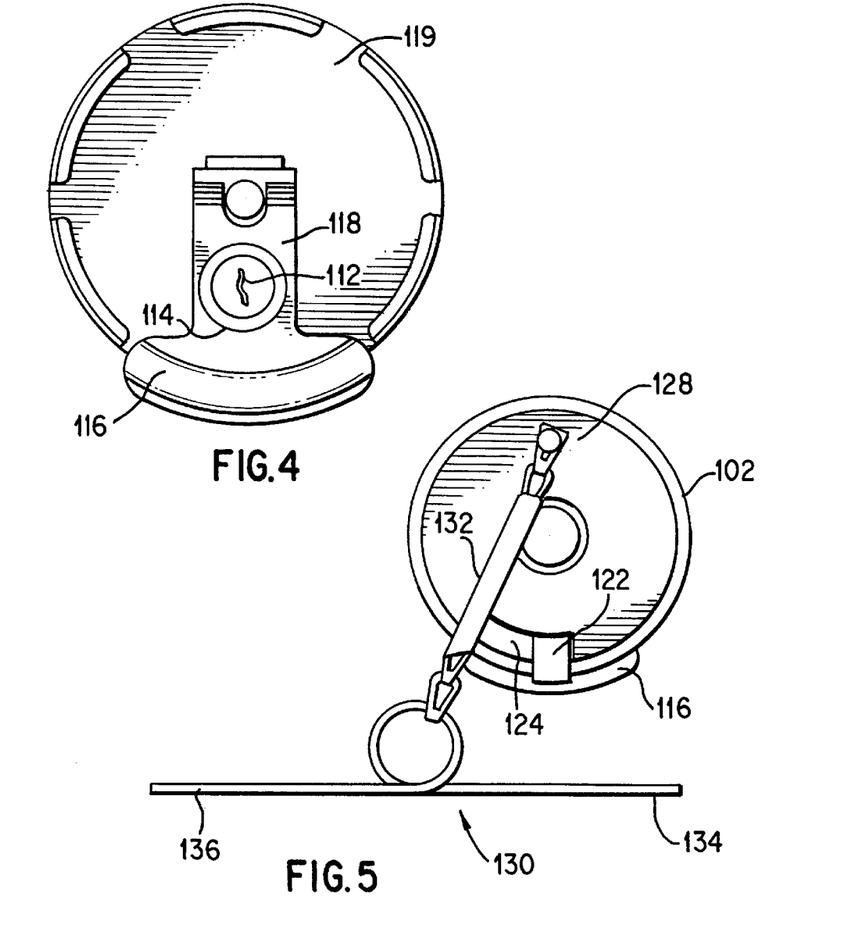
FIG. 4 is a top view of the filler cap in FIG. 3.
FIG. 5 is a bottom view of the assembly in FIG. 3 showing a retainer attached to the filler cap.

The top 32 is cup-shaped, having a substantially flat top plate 33 integrally formed with a substantially cylindrical top wall 60 which terminates in a rim having an outwardly beveled surface 62. The top plate 33 has a periphery 52 which extends beyond the top wall 60. The periphery 52 extends over a portion of the sleeve lip 12, when the cap is inserted into the sleeve 10. Arc-shaped protrusions 50 are formed on the top plate 33 around a substantial portion of the periphery 52. As best shown in FIG. 4, protrusions are preferably of equal size and formed at regular intervals around the periphery 52.

The purpose of the protrusions 50 is to protect the filler cap, and thus prevent leakage of fuel or other liquids. This is most critical when a shock is imparted to the cap, during a collision or other accident. If an impact were to be imparted to the filler cap, the protrusions 50 would receive the initial shock and, being situated over the periphery 52, will transfer the shock to the sleeve lip 12, and from there, to the tank itself. Thus, the cap 30 transfers the entire shock from an impact to the tank.

Also formed on the top plate 33 is a cam stop 54 placed directly behind the cam lever. The purpose of the stop 54 is to prevent the cam lever 36 from being accidentally applied in the wrong direction. The cam stop 54 is shorter than the protrusions 50, and so would not normally receive an impact imparted to the filler cap.

The top plate 33 is provided with a central opening 56. The opening 56 extends through the top plate 33 and through a top bearing 58 integrally formed on the underside of the top plate 33. When the filler cap is assembled, the shaft 38 extends through the opening 56 and is fixed at one end to the cam lever 36 in a hinged manner by means of pin 40. Thus, the cam lever 36 is a manually operated actuator used to seal and unseal the filler cap.

The base 34 is formed with a base plate 64 and an integrally formed, substantially cylindrical base wall 66. A circular pedestal 68 is integrally formed on the inner surface of the base plate 64, at a central area thereof. A base opening 80, sized to accommodate the shaft 38, is provided in the pedestal 68.

The base wall 66 has substantially the same outer diameter as the top wall 60, but preferably has a somewhat smaller inner diameter. Thus, the base wall 66 is somewhat thicker than the top wall 60. The base wall terminates in a rim having an axially extending projection 70 formed at its inner edge and an outwardly beveled surface 72 formed at its outer edge. The projection is formed so that it can telescope into the cap top 32, past the inside rim of the top wall 60.

The top and base members are held together by the shaft 38 and cam lever 36, the latter of which cannot pass through the central opening 56. The shaft 38, which moves slideably relative to the top member, is provided with an end cap 74 which has a slightly smaller diameter than the pedestal 68.

Surrounding the base of the shaft and between the base end cap 74 and the underside of the pedestal 68, is a quantity of thermally sensitive melt-out material 82. If, with the cap in the sealed position, the temperature of the material 82 reaches the melting point, the material will liquefy. Once the material 82 liquifies, the spring load will force the base 34 down. This will allow the O-ring 20 to retract from the channel 14 and any pressure in the tank to vent. Thus, this feature provides an added measure of protection against explosions caused by excess heat build-up.

During assembly, the shaft 38 is inserted through the base opening 80. The end cap 74 and the thermally sensitive melt-out material 82 then occupy a recess 76 formed on the underside of the pedestal 68. Thus, the combination of the end cap 74 and the material 82 prevent the shaft from passing through the base opening 80.

The spring 42 is then inserted over the shaft 38, one end of the spring coming to rest on the pedestal 68. Next, the top 32, with its top bearing 58 leading, is inserted over the shaft 38, compressing the spring. Thus, the top bearing 58 provides lateral stability to the shaft 38. Holes in the cam lever 36 and the shaft are then brought into alignment and a pin 40 is inserted through the holes. This fastens the cam lever 36 to the shaft 38 in a hinged manner. The holes in the cam lever are placed so as to provide the cam lever 36 with an eccentric axis of rotation.

When the top and base are brought together in this manner, a concave, V-shaped groove 78 is formed by the opposing bevelled surfaces 62, 72. An elastic O-ring 20 is then slid into the groove 78, completing assembly of the filler cap.

As assembled, the walls of the filler cap which are inserted into the sleeve 10 are rotationally symmetric. Thus, the filler cap may be placed into the sleeve 10 without regard to its orientation, thus facilitating its insertion and removal.

This is unlike an indexed, threaded filler cap which must first be turned to align the threads before it can be screwed on.

As stated above, the filler cap is cam operated. The filler cap may be inserted into the sleeve 10 in any orientation so long as the cam lever 36 is in the upright, or unsealed, position, as shown in FIG. 1. With the cam lever 36 in this position, the O-ring 20 rests in the groove 78 across from the channel 14 and is not forced into the channel.

When the cam lever 36 is moved from the unsealed position of FIG. 1 to the sealed position of FIG. 2, a number of changes take place. First, the cam action pulls up the shaft, bringing the base 34 closer to the top 32 and compressing the spring 42 in the process. Second, the projection 70 slides past the inner rim of the top wall 60 squeezing the O-ring 20 as the outwardly beveled surfaces 62, 72 ramp the O-ring 20 outward and upward. In this manner, the O-ring 20 is pushed outward and upward into the channel 14, forming a seal between the filler cap 30 and the sleeve 10. The channel 14 retains the O-ring 20, and pulls the top downward. The force imparted against the underside of the channel 14 causes the cap to be firmly seated against the sleeve.

In the case of the sealing arrangement shown in FIG. 8, the circumferential bead 210 engages the sleeve top radius 212 and, as the cam lever is completely pushed down, the bead becomes fully seated. Thus, the filler cap is maintained in position and provides protection against a blow-out due to pressure build-up in a tank. This contrasts with the purely frictional force applied in the absence of a channel wherein the O-ring 20 simply presses against the smooth cylindrical wall of the sleeve.

When the cam lever 36 is moved from the sealed position of FIG. 2 back to the unsealed position of FIG. 1, the force of the O-ring 20 pushing radially inward, along with the release of the compressed spring 42, pushes apart the top 32 and base 34. The cap can then be removed and a nozzle inserted to introduce fuel or other liquids. The underside of the channel 14, being recessed, is not damaged by the insertion of the nozzle.

Although in the preferred embodiment, the O-ring has a circular cross-section, its cross-section may take other shapes, as well. For instances, it can be "D" shaped, or trapezoidal, or some other shape. Similarly, the channel cross-section can also be something other than semicircular as long as it forms a tight seal with the O-ring.

FIG. 3 shows a sleeve 102 with its sleeve lip 104 abutting the wall 100 of a tank. A filler cap 105, shown in its sealed position, is inserted into the sleeve 102. The filler cap 105 is provided with a lock 110 operable by a key, inserted into a keyhole 112 (FIG. 4) formed at one end of the lock.

As shown in FIG. 3, attached to the other end of the lock 110 is an S-shaped locking lever 120. As is known to those skilled in the art, in the arrangement of FIG. 3, the locking lever is rotatably mounted to the lock 110 and turns with the key. The locking lever 120 has a leg 122 which extends outward from the filler cap through an opening 124 formed in the wall 126 and baseplate 128. The leg 122 is rotatable between a locked position, in which the leg extends beyond the lower edge 106 of the sleeve, as shown in FIG. 3, and an unlocked position in which the leg 122 does not extend beyond the bottom edge of the sleeve.

When in the locked position and with the filler cap unsealed, the extending leg 122 abuts the lower edge 106 of the sleeve 102, thus preventing removal of the filler cap. Conversely, when in the unlocked position and with the filler cap unsealed, the leg 122 does not impede removal of the filler cap. This feature protects the tank from pilferage and tampering using a filler cap made in accordance with the present invention.

As shown in FIGS. 3 and 4, the keyhole 112 is protected by the handle 116 when the handle is in the down position. To access the keyhole, one lifts the handle 116, which is connected to the cam lever 118. Lifting the handle relaxes the seal relieves any tank pressure even though the lock leg 122 is engaged. As shown in FIG. 4, the cam lever 118 has a cutout 114 formed therein through which one may view the keyhole. The purpose of the cutout 114 is to allow the cam lever 118 to close over the profile of the lock 110 which rises above the top plate 119. As shown in FIG. 4, the handle 116 extends beyond the periphery of the top plate 119. This facilitates access to the handle, and thus the cam lever 118, allowing one to seal and unseal the filler cap even while wearing a gloved hand.

As shown in FIG. 5, a retainer 130 is attached to the base plate 128 of the filler cap by means of a chain 132 or other suitable connection. The retainer remains in the tank when the filler cap is removed. For this, the retainer arms 134, 136 are sized to prevent removal through the sleeve when the arms are horizontal. Thus, the retainer arms 134, 136 prevent inadvertent removal of the retainer 130.

Figure 6:
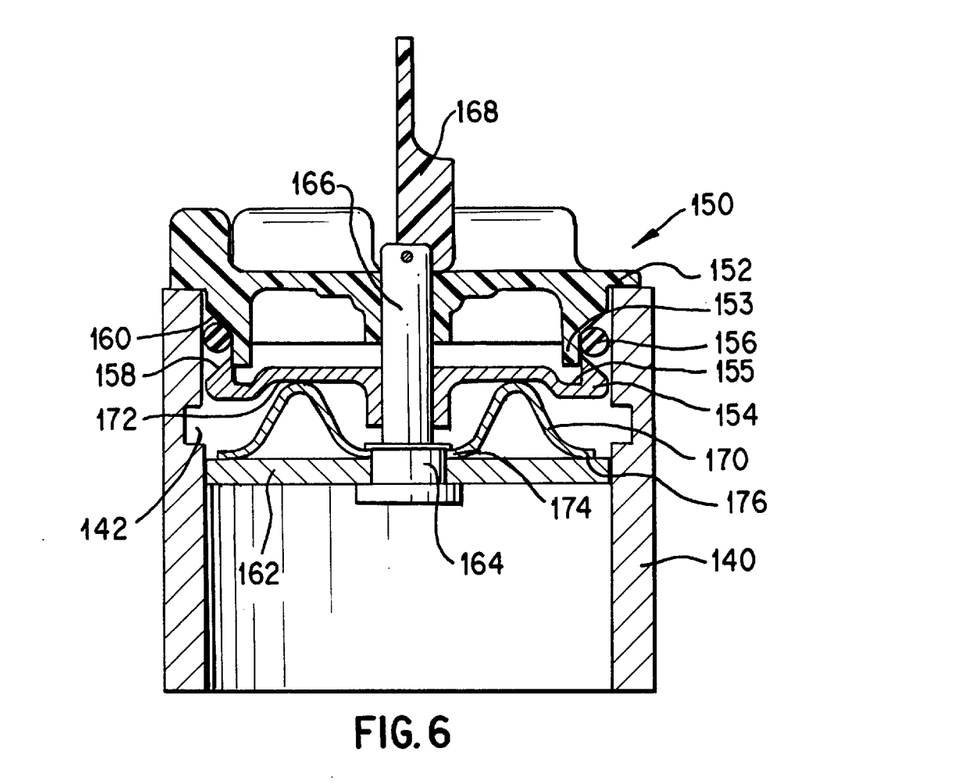
FIG. 6. is a cut-away view of a second embodiment of a filler cap assembly in accordance with the invention, shown in the unsealed position.

FIG. 6 shows an alternate embodiment of the present invention. Here again, the sleeve has a substantially cylindrical wall 140 with a circumferential channel 142 formed on its inner surface. The filler cap 150 of this embodiment also comprises a top member 152 and an opposing base member 154 and a sealing element 156 positioned between opposing bevelled surfaces 158, 160. In this case, however, the projecting member 153 is attached to the top member 152.

The filler cap 150 also comprises a bottom plate 162 attached to a hub 164 which, in turn, is attached to a central shaft 166. In this embodiment, the central shaft 166 slideably moves relative to both the top member 152 and the base member 154. Again, a cam lever 168 operatively connected to the shaft 166 is used to move the filler cap between an unsealed and a sealed position, the latter position shown in FIG. 7.

At least one locking spring 170 is placed between the base plate 162 and the underside 172 of the base member 154. At one end of the locking spring 170 is a first leg 174 wedged between the bottom plate 162 and the hub 164. The locking spring terminates in a second leg 176 at its other end. Viewed from above, the locking spring is a single disk-shaped member. Alternatively, a plurality of wedge-shaped segments may be used.

When the cam lever 168 is moved from the unlocked to the locked position, the bottom plate 162 rises and the locking spring 170 pushes up the base member 154 until the base member upper surface 155 abuts the projection 153. At this point, the base member does not rise any further. The bottom plate 162, however, continues to rise and compresses the locking spring 170 until the filler cap 150 enters the sealed position.

Figure 7:
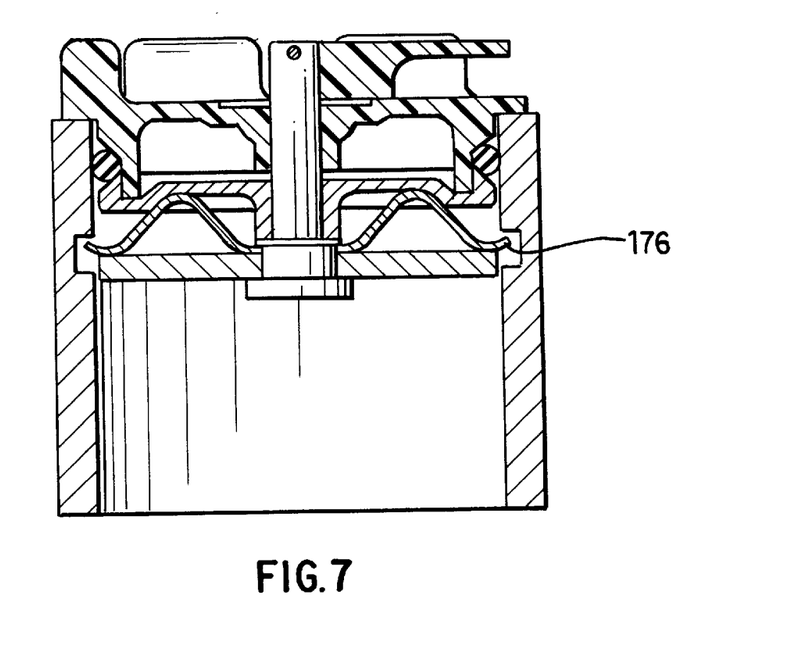
FIG. 7. is a cut-away view of the assembly of FIG. 6 shown in a sealed position.

As shown in FIG. 7, when the filler cap is in the sealed position, the locking spring 170 is compressed between the bottom plate 162 and the base member 154. When compressed, the second leg 176 enters into the channel 142. In this position, dislodgement of the sealing member is prevented, providing protection against blow out of the filler cap 150 due to pressure build-up. Although not shown in FIGS. 6 and 7, it should be evident that a quantity of thermally sensitive melt-out material may be placed between the base of the shaft 166 and the bottom plate 162, not unlike the case in the embodiment of FIGS. 1 & 2.

Figure 9:
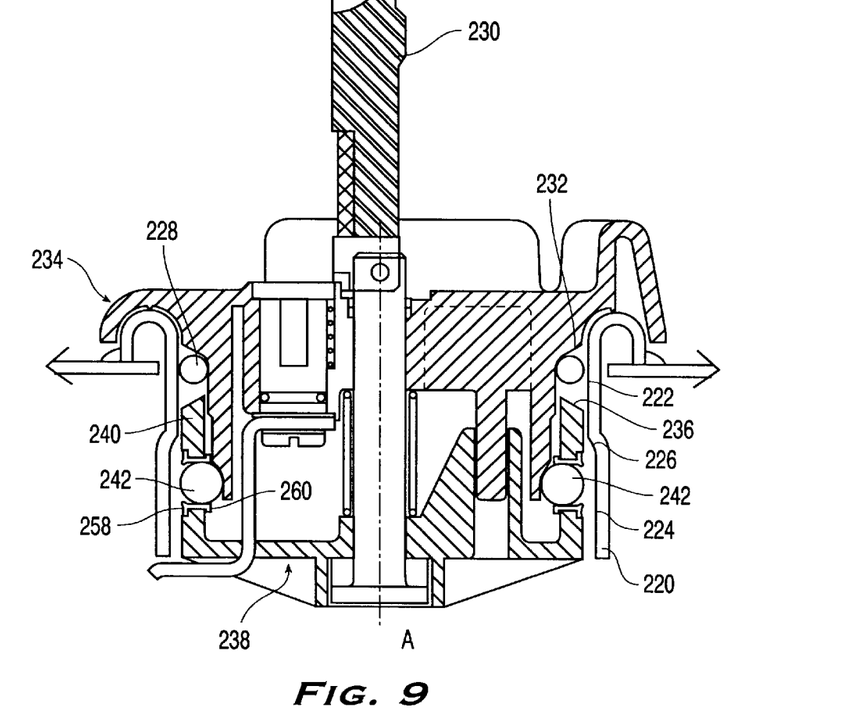
FIG. 9. is a cut-away view of a third embodiment of a filler cap assembly in accordance with the invention, shown in the unsealed position.
Figure 10:
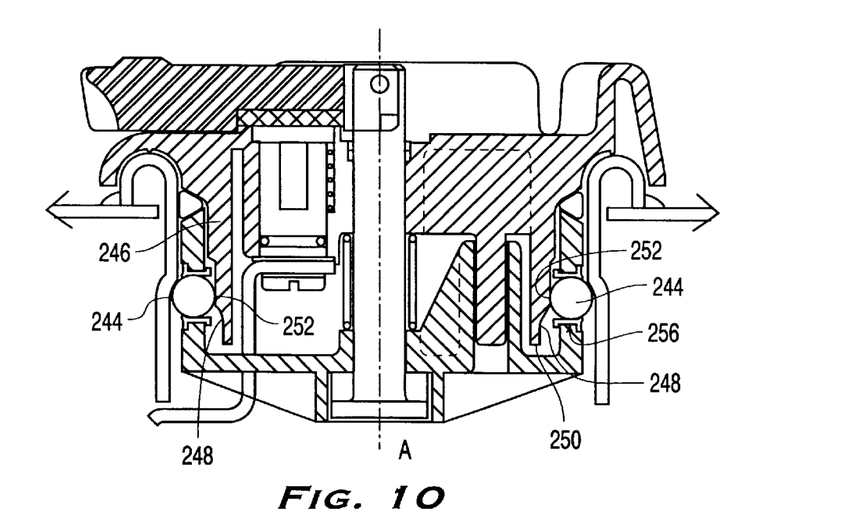
FIG. 10. is a cut-away view of the assembly of FIG. 9 shown in a sealed position.

FIGS. 9 and 10 show another embodiment of a filler cap assembly in accordance with the present invention. In this embodiment the sleeve 220 has an inner wall comprising an upper 222 and a lower section 224. The upper section 222 has an inner diameter which is smaller than the lower section 224. The two sections are adjacent to one another and are connected by a tapered transition region 226 in which the inner diameter varies gradually. Alternatively, the upper and lower sections may be joined by a stepped region in which the inner diameter changes abruptly.

A compressible sealing element 228, preferably an O-ring is used to form a seal when the cam lever 230 is moved to the closed position, as shown in FIG. 10. The O-ring 228 is squeezed between a first surface 232 formed on the top member 234 and a second surface 236 formed on the base member 238. As shown in FIGS. 9 and 10, the surfaces are outwardly bevelled towards the inner wall of the sleeve 220, with the second surface being disposed on the periphery of a base wall 240, which preferably is annular. It should be noted that instead of a bevel, a curve or other formation may also serve the purpose of deforming the O-ring 228 in a suitable manner.

As best seen in FIG. 10, when the two surfaces are moved towards each other, the O-ring deforms, and a portion of the O-ring abuts the inner wall of the sleeve, thus forming a seal which resists accidental removal of the cap. This resistance, however, is supplemented by the use of a movable locking element, shown as substantially spherical lock bearings 242 mounted in the base wall 240. When the cap is inserted into the sleeve the lock bearings 242 are across from the lower section 224 of the sleeve's inner wall, as shown in FIG. 9.

When the cam lever 230 is lowered, as shown in FIG. 10, the lock bearings 242 are pushed radially outward by a surface formed on the top member 234, against the inner wall of the sleeve near the transition region 226. The radially outermost portion 244 of the lock bearings end up farther from the longitudinal axis A of the filler cap than the inner wall of the sleeve at its upper section 222. In other words, the outermost portion 244 of the lock bearings 242 are wedged at the transition region 226 at a point which is outwardly displaced relative to the inner diameter of the upper section 222. With the lock bearings so wedged, the filler cap cannot be removed from the sleeve 220.

The top member 234 of the filler cap is provided with a downwardly projecting top wall 246. The top wall 246 is provided with an outwardly facing curved surface 248 near its end 250 and an outwardly facing forcing surface 252 on one side of the curved surface 248, away from its end 250. With the cam lever 230 in the open position, as shown in FIG. 9, the curved surface 248 is across from the lock bearing 242. As the lock bearing 242 is movably held in the base wall 240, it can partially enter the concavity afforded by the curved surface 248. This allows the filler cap to be removed from the sleeve 220 without the lock bearing 242 being wedged by the transition region 226 between the upper 222 and lower 224 sections of the sleeve inner wall.

When the cam lever 230 is moved from the open position of FIG. 9, to the closed position of FIG. 10, the central shaft moves upward, bringing along the base member 238. As a consequence, the lock bearings 242 move upward relative to the top wall 246. In this process, the lock bearings roll up the curved surface 248 and are pushed in an outward direction by the forcing surface 252 against the sleeve's inner wall at the transition region 226, where they are wedged.

The lock bearings 242 are preferably formed from brass or other metal which does not create a spark. Alternatively, they may be formed from nylon or hard plastic or other synthetic materials. Each lock bearing is movably held in an annular bearing retainer 256, shown in cross-section in FIGS. 9 and 10. The bearing retainer 256 is preferably formed from a slightly deformable, hard plastic material, or the like.

The lock bearing 242 is prevented from falling out of the retainer 252 by means of two rims 258, 260 formed on either end of the retainer 256. The outer rim 258, faces the inner wall of the sleeve 220. The inner rim 260, which faces the interior of the filler cap, has a larger diameter than the outer rim 258.

During assembly, a retainer is snap-fitted into an opening in the base wall 240. The lock bearing 242 is then snapped into its retainer 256 by forcing it through the opening surrounded by the inner rim 260. Once in the retainer 256, the lock bearing 242 has some free play and is not immobilized. It can move around, as limited by the outer 258 and inner 260 rims. When the filler cap is in the sealed position of FIG. 10, the lock bearing 242 is prevented from escaping from the retainer 256 by the latter's outer rim 258, which is too small for the lock bearing 242 to pass through.

As shown in FIGS. 9 and 10, the filler cap is provided with two lock bearings, each occupying a bearing retainer. Thus, the two lock bearings are 180° apart. It should be obvious to one skilled in the art that the filler cap may be provided with more than just the two retainers shown. For instance, a more preferable arrangement with three retainers, each 120° apart, or four retainers, 90° apart, and so on, may be used. When the filler cap is moved from the unsealed to the sealed position, each of the lock bearings associated with these retainers would be forced against the sleeve inner wall by a corresponding forcing surface belonging to the top wall 246. Alternatively, each forcing surface may be formed on a downwardly projecting post fixed to the top member 234, if such posts were sufficiently rigid.

It should be noted that features shown in one figure may be combined with features shown in another. For example, the cam stop 54 in FIGS. 1 and 2 could also be used in the embodiment of FIGS. 6 and 7, and the embodiments of FIGS. 9 and 10. Similarly, the retainer 130, shown in FIG. 5, could be attached to the bottom plate 162 of either of the other embodiments. And, as stated above, the arrangements discussed with respect to FIG. 8, may be provided for the filler cap assembly of FIGS. 1–3.

Also, while there has been described what is at present considered to be a preferred embodiment of this invention, it will be clear to those skilled in art that various changes and modifications may be made without departing from the invention which is intended to cover all such changes and modifications as fall within the true spirit and scope of the claims set forth hereunder.

What is claimed is:

1. A filler cap comprising:
   a) a top member comprising a top wall having an outwardly beveled first surface disposed along a periphery thereof;
   b) a base member comprising a base wall having an outwardly beveled second surface disposed along a periphery thereof, said second surface opposing said first surface;
   c) means for moving said first and second surfaces towards and away from each other; and
   d) a ring-shaped compressible sealing element positioned between said first and second surfaces and movable upon being compressed by movement of said first and second surfaces toward each other, from a first, unsealed position to a second, sealed position disposed radially outward of said surfaces, wherein said means for moving comprises:

a shaft extending between said top and base members, a first end of said shaft slideably engaging an opening in said top member;

a manually operable cam lever attached to said first end of the shaft, said cam lever movable between a sealed and an unsealed position; and a spring coaxially mounted with said shaft, a first end of the sprint abutting said top member and a second end of the spring abutting said base member, said filler cap further comprising:

a thermally sensitive material placed along a portion of said shaft and maintaining said top and base members at a predetermined distance when said sealing element is in a sealed position, said thermally sensitive material liquefying when heated, thereby allowing said top and said base members to move apart.

2. A filler cap comprising:
a) a top member having a first surface formed thereon;
b) a base member having a second surface formed thereon, said second surface opposing said first surface;
c) means for moving said first and second surfaces towards and away from each other;
d) a compressible sealing element positioned between said first and second surfaces and movable, upon being compressed by movement of said first and second surfaces toward each other, from an unsealed position, to a sealed position disposed radially outwardly of said surfaces;
e) a locking element having a portion thereof movable between a disengaged position and an engaged position which is radially outward of said disengaged position; and
f) a third surface formed on one of said top and base members, said third surface arranged to abut and force said locking element to move from said disengaged position to said engaged position, when said means for moving are activated to move said first and second surfaces towards each other.

3. The filler cap of claim 2 further comprising:
a) a lock having a rotatable locking leg movable between an unlocked and a locked position, said leg extending outwardly from said filler cap, when in said locked position.

4. The filler cap of claim 2, further comprising
a bottom plate spaced apart from said base member and positioned such that said base member is between said top member and said bottom plate, said bottom plate being moved towards and away from said base member upon activation of said moving means.

5. The filler cap of claim 4, wherein
said locking element is a leaf spring positioned between said base member and said bottom plate, a lower surface of said base member forming said third surface.

6. The filler cap of claim 4 wherein said means for moving comprises:
a) a shaft extending between said bottom plate and said top member, a first end of said shaft slideably engaging an opening in the top member;
b) a manually operable cam lever attached to said first end of the shaft, said cam lever movable between a sealed and an unsealed position; and
c) a leaf spring positioned between the bottom plate and the base member, said leaf spring being compressed when said cam lever is in the sealed position.

7. The filler cap of claim 2 wherein said means for moving comprises:
a) a shaft extending between said top and base members, a first end of said shaft slideably engaging an opening in said top member;
b) a manually operable cam lever attached to said first end of the shaft, said cam lever movable between a sealed and an unsealed position; and
c) a spring coaxially mounted with said shaft, a first end of the spring abutting said top member and a second end of the spring abutting said base member, said spring being compressed when said cam lever is in the sealed position.

8. The filler cap of claim 7 further comprising:
a) thermally sensitive material placed along a portion of said shaft and maintaining said top and base members at a predetermined distance when said sealing element is in a sealed position, said thermally sensitive material liquefying when heated, thereby allowing said top and said base members to move apart.

9. The filler cap of claim 2 wherein one of said top and base members comprises a substantially annular outer wall, a corresponding one of said first and second surfaces being formed on a periphery of said wall.

10. The filler cap of claim 9 wherein at least one of said first and second surfaces is outwardly beveled.

11. The filler cap of claim 9 wherein
said outer wall has a plurality of equidistantly spaced locking elements movably mounted therein, and
said third surface is formed on the other of said top and base members.

12. A filler cap assembly comprising:
a) a sleeve having a longitudinal axis and an inner wall, said inner wall comprising first and second sections, said first section having a smaller inner diameter than said second section; and
b) a filler cap shaped and sized to be inserted into said sleeve, said filler cap comprising:
c) a top member having a first surface formed thereon;
d) a base member having a second surface formed thereon, said second surface opposing said first surface;
e) means for moving said first and second surfaces towards and away from each other;
f) a compressible sealing element positioned between said first and second surfaces and movable, upon being compressed by movement of said first and second surfaces toward each other, from an unsealed position, to a sealed position disposed radially outward of said surfaces;
g) a locking element having a portion thereof movable between a disengaged position, and an engaged position radially outward of said disengaged position; and
h) a third surface formed on one of said top and base members, said third surface arranged to abut and force said locking element to move from said disengaged position to said engaged position, when said means for moving are activated to move said first and surfaces towards each other;

wherein an outer periphery of said locking element extends beyond an inner diameter of said first section, when in the engaged position, and said compressible sealing element abuts said first section, when in the sealed position.

13. The assembly of claim 12 wherein:
a) said filler cap top member further comprises a top plate and a plurality of protrusions formed on a periphery thereof in longitudinal alignment with said sleeve, when said cap is positioned within said sleeve.

14. The assembly of claim 12 wherein:

a) an end of the sleeve adjacent said first annular section is provided with a downwardly projecting lip, and the filler cap top member is provided with a complementary lip contoured to fit at least a portion of the downwardly projecting lip, said complementary lip being further provided with a bead member for seating said top member onto said sleeve.

15. The assembly of claim 12 wherein:

a) said first and second sections are connected by a tapered transition region.

16. The assembly of claim 12 wherein:

a) said first and second sections are connected by a stepped transition region.

17. The assembly of claim 12 wherein:

a) said second section comprises a circumferential channel.

18. A filler cap assembly comprising:

a) a sleeve having a longitudinal axis and an inner wall, said inner wall being formed with a circumferential channel; and b) a filler cap shaped and sized to be inserted into said sleeve, said filler cap comprising:

c) a top member having a first surface formed thereon;

a) a base member having a second surface formed thereon, said second surface opposing said first surface;

c) a bottom plate spaced apart from said base member, said bottom plate being positioned such that said base member is between said top member and said bottom plate;

d) a shaft arranged to move said first and second surfaces towards and away from each other, and said base member and said bottom plate towards and away from each other; and e) a compressible sealing element positioned between said first and second surfaces and movable, upon being compressed by movement of said first and second surfaces toward each other, from an unsealed position to a sealed position disposed radially outward of said surfaces;

said sealing element forming a sealing engagement with said sleeve inner wall at a position away from said circumferential channel, when compressed, and a spring at least partially entering said circumferential channel, when said sealing element is compressed.

19. A filler cap comprising:

a) a top member having a first surface formed thereon;

b) a base member having a second surface formed thereon, said second surface opposing said first surface;

c) a shaft arranged to move said first and second surfaces towards and away from each other;

d) a compressible sealing element positioned between said first and second surfaces and movable, upon being compressed by movement of said first and second surfaces toward each other, from an unsealed position, to a sealed position disposed radially outwardly of said surfaces;

e) a locking element having a portion thereof movable between a disengaged position and an engaged position which is radially outward of said disengaged position; and f) a third surface formed on one of said top and base members, said third surface arranged to abut and force said locking element to move from said disengaged position to said engaged position, when said shaft is activated to move said first and second surfaces towards each other.

20. The filler cap of claim 19, wherein a plurality of circumferentially spaced apart locking elements are provided, each of said locking elements being movable between a disengaged position and an engaged position which is radially outward of said disengaged position.

21. The filler cap of claim 20, wherein each of said locking elements is spherical.

22. A filler cap assembly comprising:

a) a sleeve having a longitudinal axis and an inner wall, said inner wall comprising first and second sections, said first section having a smaller inner diameter than said second section; and b) a filler cap shaped and sized to be inserted into said sleeve, said filler cap comprising:

c) a top member having a first surface formed thereon;

d) a base member having a second surface formed thereon, said second surface opposing said first surface;

e) a shaft arranged to move said first and second surfaces towards and away from each other;

f) a compressible sealing element positioned between said first and second surfaces and movable, upon being compressed by movement of said first and second surfaces toward each other, from an unsealed position, to a sealed position disposed radially outward of said surfaces;

g) a locking element having a portion thereof movable between a disengaged position, and an engaged position radially outward of said disengaged position; and h) a third surface formed on one of said top and base members, said third surface arranged to abut and force said locking element to move from said disengaged position to said engaged position, when said shaft is activated to move said first and surfaces towards each other;

wherein an outer periphery of said locking element extends beyond an inner diameter of said first section, when in the engaged position, and said compressible sealing element abuts said first section, when in the sealed position.

23. The assembly of claim 22 wherein:

a) said filler cap top member further comprises a top plate and a plurality of protrusions formed on a periphery thereof in longitudinal alignment with said sleeve, when said cap is positioned within said sleeve.

24. The assembly of claim 22 wherein:

a) an end of the sleeve adjacent said first annular section is provided with a downwardly projecting lip, and the filler cap top member is provided with a complementary lip contoured to fit at least a portion of the downwardly projecting lip, said complementary lip being further provided with a bead member for seating said top member onto said sleeve.

25. The assembly of claim 22 wherein:

a) said first and second sections are connected by a tapered transition region.

26. The assembly of claim 22 wherein:

a) said first and second sections are connected by a stepped transition region.

27. The assembly of claim 22 wherein:

a) said second section comprises a circumferential channel.

\* \* \* \* \*